T. R. SNYDER.
TIRE RIM DETACHER.
APPLICATION FILED DEC. 4, 1916.
1,227,011. Patented May 22, 1917.
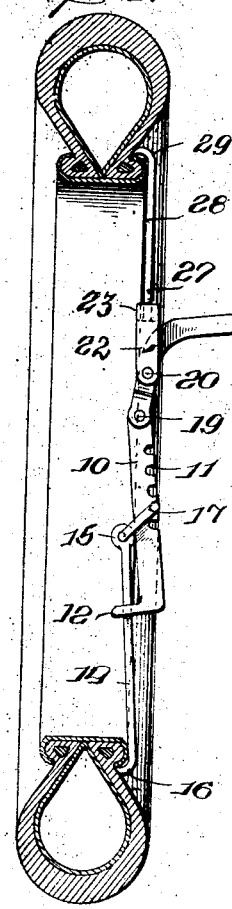
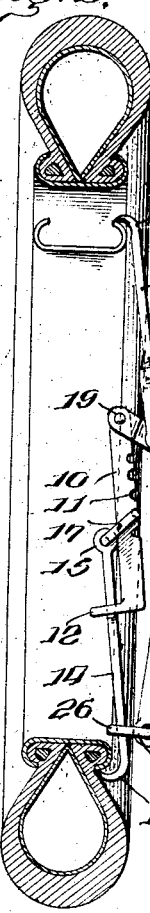
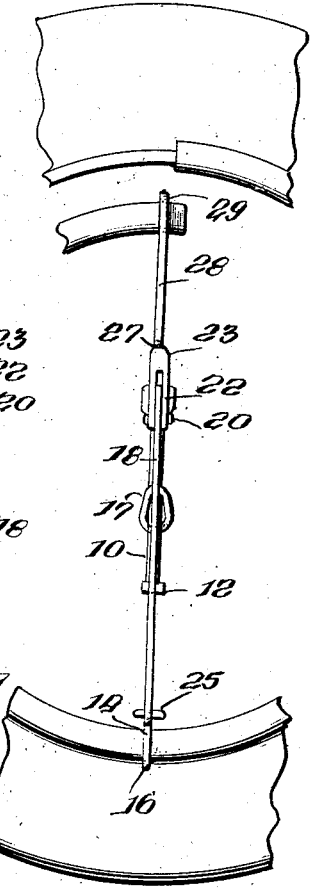
Inventor
T. R. Snyder

UNITED STATES PATENT OFFICE.

THOMAS R. SNYDER, OF BARBERTON, OHIO, ASSIGNOR OF ONE-FOURTH TO WILLIAM H. WERLEY, OF BARBERTON, OHIO.

TIRE-RIM DETACHER.

1,227,011. Specification of Letters Patent. Patented May 22, 1917.

Application filed December 4, 1916. Serial No. 135,011.

*To all whom it may concern:*

Be it known that I, THOMAS R. SNYDER, a citizen of the United States, residing at Barberton, in the county of Summit and State of Ohio, have invented certain new and useful Improvements in Tire-Rim Detachers, of which the following is a specification.

This invention relates to implements for removing detachable rims from pneumatic and similar vehicle tires, and has for one of its objects to produce a simply constructed device whereby a remountable rim may be quickly detached from a tire casing without injury to the casing.

Another object of the invention is to provide a device of this character which may be readily folded into small space when not in use, for storage in the tool box of an automobile.

Another object of the invention is to provide a device of this character which may be quickly adjusted to fit rims of varying sizes without structural change or the removal of any of the parts.

With these and other objects in view, the invention consists in certain novel features of construction, as hereinafter shown and described and then specifically pointed out in the claim; and in the drawings illustrative of the preferred embodiment of the invention—

Figure 1 is a side elevation of the improved implement applied and in open position with the rim and tire casing in section transversely.

Fig. 2 is a view similar to Fig. 1 with the improved implement in closed position or with the rim depressed.

Fig. 3 is an edge view of the improved implement in the position shown in Fig. 2 with portions of the tire casing and rim in side elevation.

Fig. 4 is an enlarged detached perspective view of the notched or body portion of the improved device.

Corresponding and like parts are referred to in the following description and indicated in all the views of the drawings by the same reference characters.

The improved implement comprises a stock 10, preferably angular bar shape, as shown in Fig. 4, and provided with a plurality of outwardly opening notches 11 in its thinner edge. The member 10 is provided at one end with a laterally directed perforated guideway 12 and perforated transversely at the other end. Slidably disposed through the guideway 12 is a pulling member 14 having an eye 15 at one end and a rim engaging projection or hook 16 at the other end. A small rod or link 17 is swingingly engaged to the eye 15 of the member 14 and adapted to embrace the stock 10 and be engaged with the notches 11 one at a time. By this means the member 14 is held constantly in parallel relation to the stock 10 and is adjustable longitudinally of the stock to any required extent within the range of the notches 11. A lever arm, represented as a whole at 18, is pivoted at 19 to the stock 10 and provided with a transverse aperture near the pivot 19 to receive a pin 20, which extends through spaced ears 22 of a socket member 23. By this means the socket member is swingingly coupled to the lever arm.

Mounted to swing at 24 to the free end of the lever arm is a rod 25 having a terminal hook 26 adapted to engage around the pulling member 14, as shown in Fig. 2, to lock the lever arm in closed position, as hereafter explained.

The socket 23 is provided with a threaded interior, and engaged with the same is the threaded terminal 27 of another pulling member 28, the outer end of the latter having a hooked rim engaging member 29, similar to the rim engaging member 16 of the pulling member 14. With a device thus constructed the operation is as follows: The lever arm 18 is moved into its upper position, as shown in Fig. 1, and the member 14 adjusted relative to the stock 10 so that the portions 16—29 of the pulling members engage with the rim of the tire, preferably with one of the members 16 or 29, as the case may be, close to one of the confronting ends of the rim, the latter being of the split form and held in position principally by its own resiliency.

The lever arm 18 is then moved into the position shown in Fig. 2, which movement will exert a strong pulling force upon the rim and compress one end portion of the latter into the position shown in Fig. 4, and releasing the tire casing. A new or repaired tire casing is then disposed in position upon the contracted rim and the lever arm released by detaching the holding member 25 to permit the parts to resume the position shown in Fig. 1, and also releasing the rim and permitting it to expand by its own resiliency, and engage the interior of the rim as before.

The improved device is simple in construction, can be cheaply manufactured and when folded can be carried with the other implements in the tool box of the automobile.

Having thus described the invention, what is claimed as new is—

An implement of the class described, comprising a stock having a lateral guide and a plurality of spaced notches, a pulling member slidable through said guide and having a rim engaging device, a link carried by said pulling member and engaging said notches one at a time to adjustably couple said pulling member to the stock, a lever arm pivoted to said stock, and another pulling member coupled to said lever arm and carrying a rim engaging device.

In testimony whereof I affix my signature.

THOMAS R. SNYDER. [L. S.]